(12) United States Patent  (10) Patent No.: US 9,347,841 B2
Carralero et al.  (45) Date of Patent: May 24, 2016

(54) OPTICAL FIBER COUPLED PHOTONIC CRYSTAL SLAB STRAIN SENSOR, SYSTEM AND METHOD OF FABRICATION AND USE

(71) Applicant: The Boeing Company, Chicago, IL (US)

(72) Inventors: Michael A. Carralero, Huntington Beach, CA (US); Ty Aaby Larsen, Everett, WA (US); Priya Maratukulam, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/793,373

(22) Filed: Jul. 7, 2015

(65) Prior Publication Data

US 2015/0316427 A1 Nov. 5, 2015

Related U.S. Application Data

(62) Division of application No. 13/658,307, filed on Oct. 23, 2012, now Pat. No. 9,086,331.

(51) Int. Cl.
*G01L 1/24* (2006.01)
*G01D 5/26* (2006.01)
(Continued)

(52) U.S. Cl.
CPC ............... *G01L 1/242* (2013.01); *G01D 5/268* (2013.01); *G01L 1/247* (2013.01); *G02B 1/005* (2013.01); *G02B 6/1225* (2013.01); *Y10T 29/49826* (2015.01); *Y10T 29/49828* (2015.01)

(58) Field of Classification Search
CPC ........... G01L 1/24; G01L 1/242; G01L 1/247; G01L 9/0079; G01D 5/268; G01D 5/353; G01D 5/35303; G01D 5/35383; G02B 6/1225; G02B 1/005

USPC .............. 356/35.5, 477–482; 385/12, 13
See application file for complete search history.

(56) References Cited

U.S. PATENT DOCUMENTS

| 4,191,470 A | 3/1980 | Butter |
| 4,492,121 A | 1/1985 | Lehto |
| 4,533,247 A | 8/1985 | Epworth |

(Continued)

FOREIGN PATENT DOCUMENTS

| EP | 1555552 A2 | 7/2005 |
| WO | 2009156410 A1 | 12/2009 |

OTHER PUBLICATIONS

Hadzialic, S., "Photonic Crystal Slabs for Optical Micro Electro Mechanical Systems (OMEMS)," Department of Physics, University of Oslo, Apr. 6, 2010.

(Continued)

*Primary Examiner* — Kara E Geisel
*Assistant Examiner* — Violeta A Prieto
(74) *Attorney, Agent, or Firm* — Patterson + Sheridan LLP

(57) ABSTRACT

The present disclosure is generally directed to a strain sensor, system and method of fabrication and use that includes an optical fiber, an optical signal generator that transmits an optical signal through the optical fiber, at least two photonic crystal slabs within the optical fiber separated by a first segment of optical fiber, a photo-detector that detects a reflected optical signal from the at least two photonic crystal slabs, and a processor that computes a mechanical strain over the first segment of optical fiber based on the reflected optical signal detected by the photo-detector.

20 Claims, 7 Drawing Sheets

(51) Int. Cl.
*G02B 1/00* (2006.01)
*G02B 6/122* (2006.01)

(56) References Cited

U.S. PATENT DOCUMENTS

| | | | |
|---|---|---|---|
| 4,533,829 A | | 8/1985 | Miceli et al. |
| 4,859,017 A | | 8/1989 | Brierley et al. |
| 5,187,983 A | | 2/1993 | Bock et al. |
| 5,202,939 A | | 4/1993 | Belleville et al. |
| 5,359,405 A | | 10/1994 | Andrews |
| 5,392,117 A | | 2/1995 | Belleville et al. |
| 5,594,819 A | | 1/1997 | Narendran et al. |
| 5,682,237 A | | 10/1997 | Belk |
| 6,075,915 A | * | 6/2000 | Koops ............... B82Y 20/00 385/123 |
| 6,101,884 A | | 8/2000 | Haake |
| 6,222,954 B1 | | 4/2001 | Riza |
| 6,263,128 B1 | | 7/2001 | Huang |
| 6,281,976 B1 | | 8/2001 | Taylor et al. |
| 6,539,136 B1 | | 3/2003 | Dianov et al. |
| 6,674,928 B2 | | 1/2004 | Johnson et al. |
| 6,691,007 B2 | | 2/2004 | Haugse at al. |
| 7,289,221 B2 | | 10/2007 | Wang et al. |
| 7,359,587 B2 | | 4/2008 | Beausoleil et al. |
| 8,494,312 B2 | * | 7/2013 | Carralero ............... G01D 5/268 359/290 |
| 8,693,813 B1 | * | 4/2014 | Carralero ............... G01D 5/268 359/290 |
| 9,086,331 B2 | * | 7/2015 | Carralero ............... G01L 1/247 |
| 2005/0175274 A1 | | 8/2005 | Gunn |
| 2005/0201660 A1 | | 9/2005 | Grot et al. |
| 2006/0257067 A1 | | 11/2006 | Bratkovski et al. |
| 2008/0129980 A1 | | 6/2008 | Dhawan et al. |
| 2009/0263079 A1 | | 10/2009 | Shapira et al. |
| 2011/0097031 A1 | | 4/2011 | Carralero et al. |
| 2012/0045165 A1 | | 2/2012 | Carralero et al. |
| 2014/0111789 A1 | * | 4/2014 | Carralero ............... G01L 1/247 356/35.5 |

OTHER PUBLICATIONS

Mallick, S.B., "Design and Fabrication of Nanostructures for Light Manipulation in Solar Cells and Microelectromechanical Systems," Dissertation, Department of Applied Physics, Standford University, Mar. 2012.

Suh, W. et al., "Displacement-Sensitive Photonic Crystal Structures Based on Guided Resonance in Photonic Crystal Slabs," Applied Physics Letters, vol. 82, No. 13, Mar. 31, 2003.

Yoshie, T. et al., "High Quality Two-Dimensional Photonic Crystal Slab Cavities," Applied Physics Letters, vol. 79, No. 26, Dec. 24, 2001.

International Search Report and Written Opinion dated Sep. 21, 2011 in PCT Application No. PCT/US10/50921.

U.S. Office Action dated Jun. 26, 2012 in U.S. Appl. No. 12/589,668.

International Search Report and Written Opinion dated Jan. 19, 2012 in PCT Application No. PCT/US11/44401.

Hadzialic, S. et al., "Two-Dimensional Photonic Crystals Fabricated in Monolithic Single-Crystal Silicon," IEEE Photonics Technology Letters, vol. 22, No. 2, pp. 67-69, Jan. 15, 2010.

Jung, I.W., et al., "High-Reflectivity Broadband Photonic Crystal Mirror MEMS Scanner with Low Dependence on Incident Angle and Polarization," Journal of Microelectromechanical Systems, vol. 18, No. 4, pp. 924-932, Aug. 2009.

Jung, I.W. et al., "Photonic Crystal Fiber Tip Sensor for Precision Temperature Sensing," IEEE Lasers and Electro-Optics Society (LEOS) Annual Meeting, pp. 761-762, Belek-Antalya, Turkey, Oct. 4-8, 2009.

Jung, I.W. et al., "Monolithic Silicon Photonic Crystal Slab Fiber Tip Sensor," 2009 IEEE/LEOS International Conference on Optical MEMS and Nanophotonics, pp. 19-20, Clearwater Beach, Florida, Aug. 17-20, 2009.

Mallick, S.B. et al., "Double-Layered Monolithic Silicon Photonic Crystals," Conference on Lasers and Electro-Optics (CLEO) 2008, Paper CThCC7, San Jose, CA, May 4-9, 2008.

Kilic, 0. et al., "External Fibre Fabry-Perot Acoustic Sensor Based on a Photonic-Crystal Mirror," IOP Publishing Measurement Science and Technology, vol. 18, No. 12, pp. 3049-3054, Sep. 2007.

* cited by examiner

OPTICAL FIBER COUPLED PHOTONIC CRYSTAL SLAB STRAIN SENSOR, SYSTEM AND METHOD OF FABRICATION AND USE

CROSS-REFERENCE TO RELATED APPLICATIONS

This application is a divisional of co-pending U.S. patent application Ser. No. 13/658,307, filed Oct. 23, 2012. The aforementioned related patent application is herein incorporated by reference in its entirety.

BACKGROUND

1. Field

The technical field presented herein is directed toward an optical fiber sensor including at least one pair of optically coupled photonic crystal slabs separated by a length of optical fiber.

2. Technical Background

Fiber Bragg Grating sensors are traditionally the optical sensor of choice in most situations. Fabrication of these traditional sensors requires removal of the optical fiber cladding and modification of the optical fiber core, and subsequent replacement of the fiber cladding. Newer methods have been developed that allow modifications in index of refraction in the fiber without the need for cladding removal yet these construction methods lead to fabrication difficulty and additional cost. Other types of sensors include affixing optical fiber strands onto materials and attempting to look for variations in transmitted light, however, these types of sensors require an optical sending and an optical receiving system tied to opposite sides of the optical fiber strand.

Other approaches look at discontinuities already present along the entire length of an optical glass fiber and use the optical fiber itself as a form of natural Bragg Grating system. The equipment needed to perform this has appeared to be expensive and complex and does not appear to lend itself to allowing other sensors to operate on the same fibers.

In contrast to optical fiber sensors, electrical based sensors and systems are believe to be far too susceptible to such environmental threats, and also none appear to offer single connection to multi-sensor hookups. Optical fiber solutions provide the benefit of being resistant to EMI, RFI, lightning and allow the optical fiber to be used in hazardous environments where electrical based sensors would not optimally function.

Another concept involves creation of a Fabry-Perot Interferometer using $TiO_2$ dielectric mirrors separated by a piece of optical fiber. This type of sensor in essence creates a much larger mirror-to-mirror structure which is similar in function to Micro-Electro-Mechanical Systems (MEMS) based Fabry-Perot Interferometers. However, the use of $TiO_2$ dielectric mirrors is limited in its use to only narrow spectrums of operating light wavelengths.

There is a need for an optical fiber based strain gauge equivalent to Fiber Bragg Grating type design, but with the advantages of emitting light wavelength selectivity, operation with or without laser sources, and interoperation with multiple strain sensors on same optical fiber. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

One aspect disclosed herein includes strain sensor system including an optical fiber, an optical signal generator that transmits an optical signal through the optical fiber, at least two photonic crystal slabs within the optical fiber separated by a first segment of optical fiber, a photo-detector that detects a reflected optical signal from the at least two photonic crystal slabs, and a processor that computes a mechanical strain over the first segment of optical fiber based on the reflected optical signal detected by the photo-detector.

Another aspect disclosed herein includes a photonic crystal strain sensor, including an optical fiber having a first end and a second end, and at least one pair of photonic crystal lattices disposed between segments of the optical fiber.

Another aspect disclosed herein includes a method of fabricating an optical fiber photonic crystal strain sensor, including providing a first fused silica communication grade optical fiber having a first end. A first photonic crystal lattice including a plurality of holes having a diameter between 0.25 microns to 1.0 micron is joined to the first end of the first optical fiber. A second fused silica communication grade optical fiber is provided having a first and a second end. One of the first end or the second end of the second optical fiber is joined to the first photonic crystal lattice, and a second photonic crystal lattice including a plurality of holes having a diameter between 0.25 microns to 1.0 micron is joined to the other distal end of the second optical fiber. These first and second photonic crystal lattices form a Fabry-Perot (etalon) Interferometer within the optical fiber between the first end and second end of the second optical fiber.

A further aspect disclosed herein includes providing an optical fiber photonic crystal strain sensor includes one pair of photonic crystal wafers disposed in an optical fiber, the one pair of photonic crystal wafers being separated by a segment of optical fiber. A first portion of optical fiber photonic crystal strain sensor is affixed to a first portion of a surface, where the first portion of optical fiber photonic crystal strain sensor includes a first photonic crystal wafer of the one pair of photonic crystal wafers. A second portion of optical fiber photonic crystal strain sensor is affixed to a second portion of the surface, where the second portion of optical fiber photonic crystal strain sensor includes a second photonic crystal wafer of the one pair of photonic crystal wafers. A first optical signal having a first wavelength is transmitted in a first direction corresponding to the one pair of photonic crystal wafers. The first optical signal is then received being reflected back from the one pair of photonic crystal wafers in an opposite direction of the first direction in the optical fiber. A strain measurement is then calculated based on the reflected first optical signal from each of the photonic crystal wafers from the one pair of photonic crystal wafers.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

The sensor presented herein is based on the use of Photonic Crystals (PC) constructed in a manner as to create Fabry-Perot Interferometers. The combination of PC materials in this configuration allowing for inter-operation of sensors on the same optical fiber using different wavelengths of light, an ability to use "sloppy" light sources such as LED as opposed to more expensive laser based light sources, and ability to sense at a very specific point as opposed to lengths of fiber.

Figure 1:
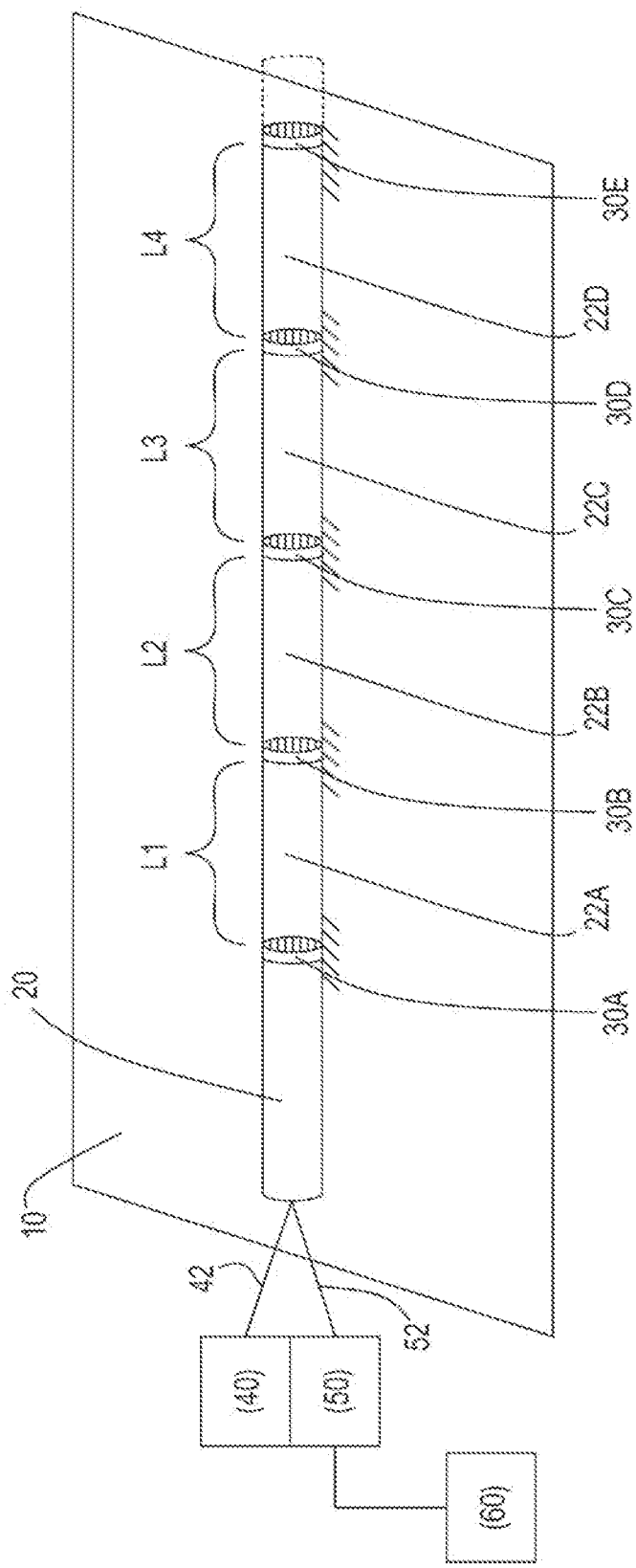
FIG. 1 illustrates a schematic diagram of an optical fiber strain sensor system.

FIG. 1 illustrates a schematic diagram of an optical fiber strain sensor system where a surface 10 needing to measure a strain value has an optical fiber 20 mechanically attached thereto. A series of pairs of photonic crystal slabs 30A-30E are representatively illustrated being disposed within the optical fiber 20 and separated by respective segments of optical fiber 22A-22D. Each pair of photonic slabs 30A-30E are separated by a length "L" of optical fiber, i.e.: photonic slabs 30A and 30B are separated by optical fiber segment 22A having a length L1; photonic slabs 30B and 30C are separated by optical fiber segment 22B having a length L2; photonic slabs 30C and 30D are separated by optical fiber segment 22C having a length L3; and, photonic slabs 30D and 30E are separated by optical fiber segment 22D having a length L4. Photonic slab 30E can be disposed at an end of the optical fiber or may have an additional segment of optical fiber joined thereto. Photonic slabs 30A-30E may be physically attached to the surface 10 of any object where a strain measurement is required between at least two photonic slabs.

The optical fiber 20 is configured to carry light to and from the photonic crystals 30A-30E. The optical fiber 20 has an optical core 24 protected from moisture, deformation, and the like, by a fiber coating or cladding 26, (see FIG. 2). At least one optical signal generator 40 such as a coherent light source is coupled to a first end of the optical fiber 20 by an optical transmission interconnect 42 to send a coherent light beam through the optical fiber 20 to the photonic crystals 30A-30E. The optical signal generator 40, is not limited to a coherent light source, and may comprise, for example but without limitation, a semi-coherent light source, a non-coherent light source, and the like. The optical signal generator 40 may include a laser or other light sources that may be determined to have a less refined optical wavelength output, for example, a Light Emitting Diode (LED).

A photo-detector 50 is coupled to the first end of the optical fiber 20 to receive reflected optical signals from the photonic crystal slabs 30A-30E transmitted in the opposite direction of the optical signals transmitted by the optical signal generator 40. Light is retained in the optical core 24 of the optical fiber 20 by internal reflection, causing the optical fiber 20 to act as a waveguide. Additionally, a processor 60 receives output signals from the photo-detector 50 and is configured to compute a mechanical strain between respective pairs of photonic crystal slabs 30A-30E along lengths L1-L4, respectively, of the optical fiber 20. Further, optical signal generator 40 and photo-detector 50 may comprise a single unit where optical signals are both transmitted and received.

Figure 2:
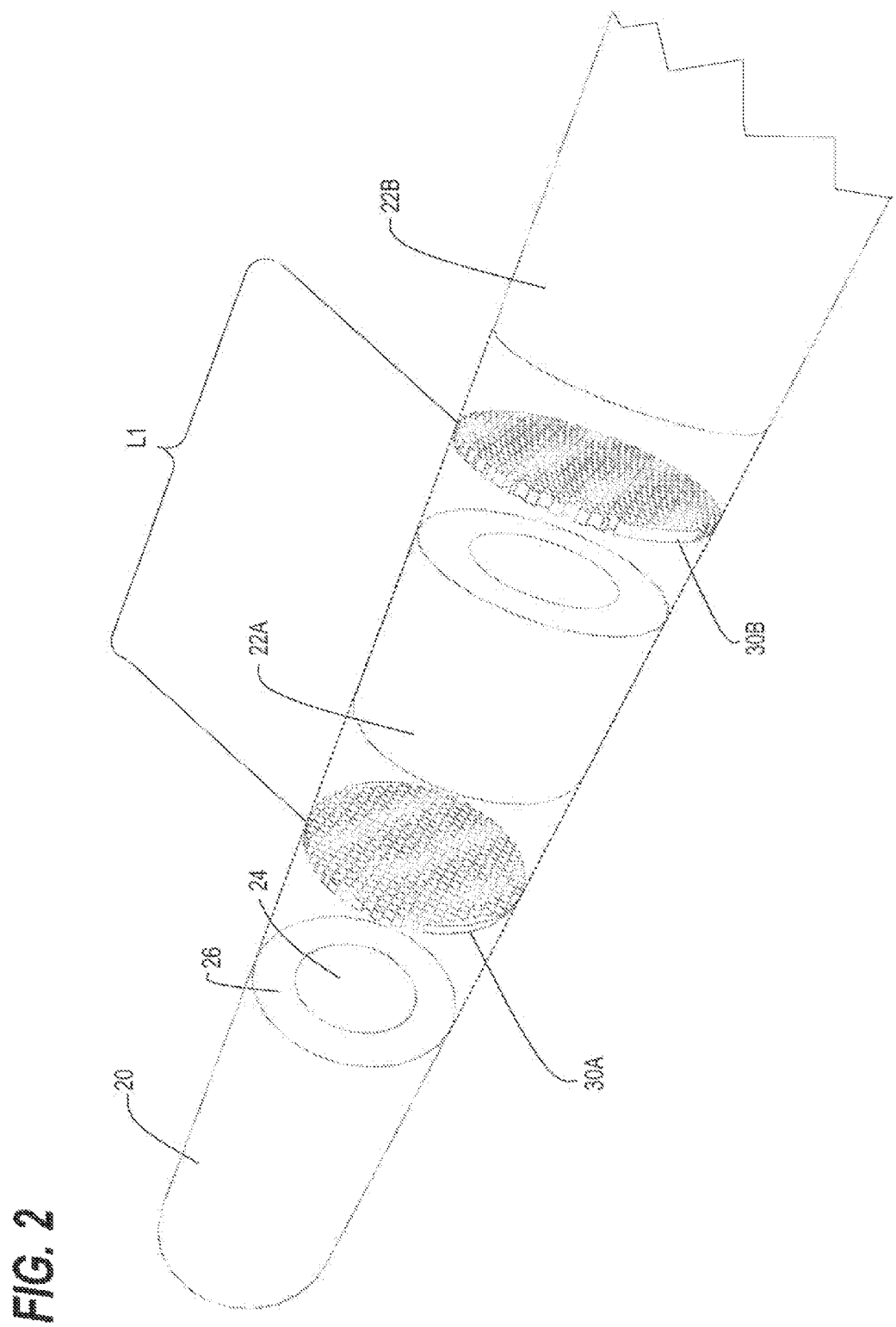
FIG. 2 illustrates a perspective exploded view of an optical fiber strain sensor system according to FIG. 1.

FIG. 2 illustrates a perspective exploded view of an optical fiber strain sensor according to FIG. 1 where an optical fiber 20 having an optical core 24 and a fiber coating or cladding 26 includes a pair of photonic crystal slabs 30A, 30B spaced apart by a length L1 by a segment of optical fiber 22A. Additionally, another segment of optical fiber 22B is connected to the outer face of photonic crystal slab 30B.

Figure 3:
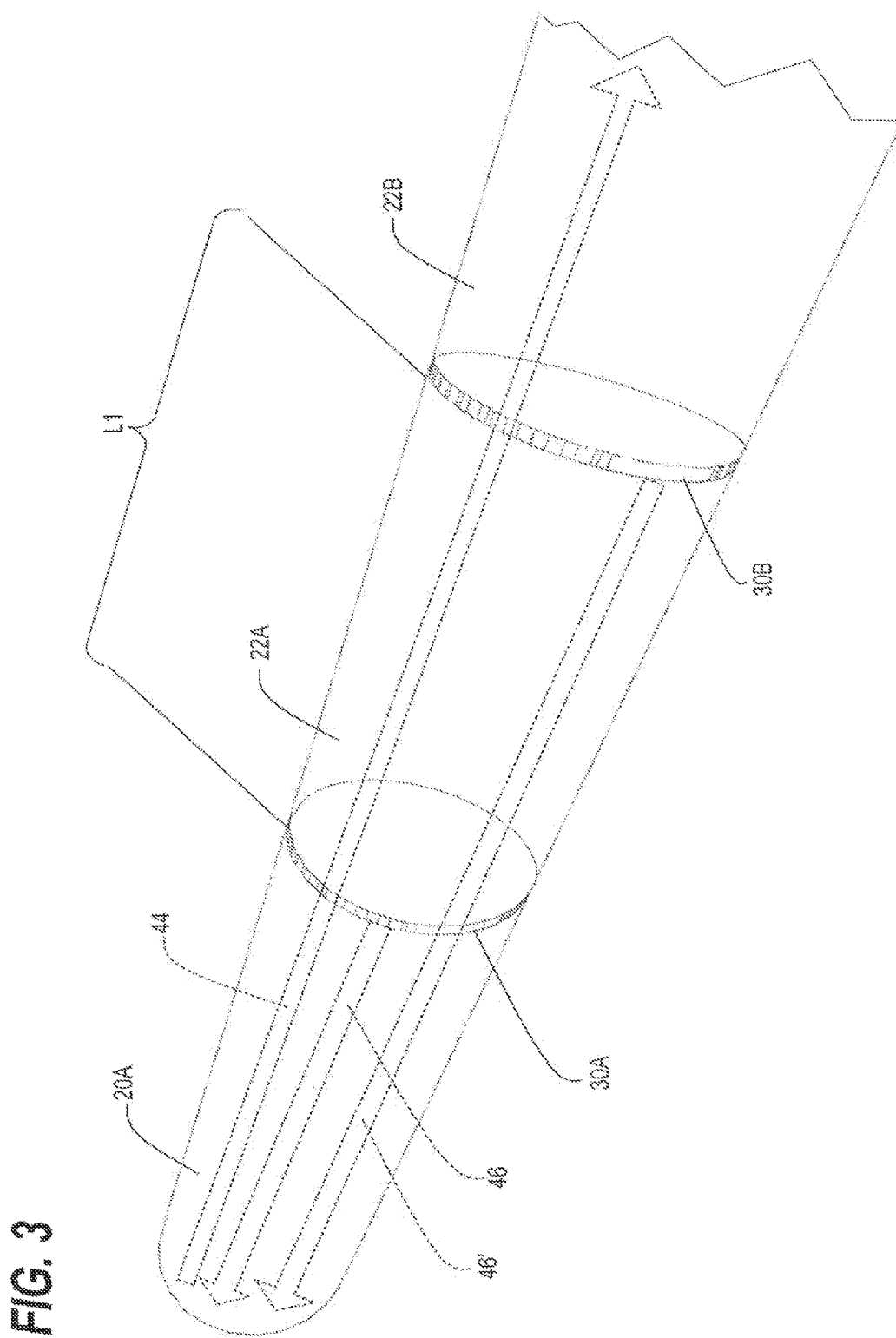
FIG. 3 illustrates a perspective assembly view of the optical fiber strain sensor of FIG. 2.

FIG. 3 illustrates a perspective assembly view of the optical fiber strain sensor of FIG. 2 where a transmission optical signal 44 from the optical signal generator 40 is transmitted along the optical fiber 20 away from the optical signal generator 40 and toward the pair of photonic crystal slabs 30A, 30B. A reflective optical signal can be reflected back from any of the photonic crystal slabs and through intervening photonic crystal slabs in the direction toward the photo-detector 50 and the optical signal generator 40. For example, reflective optical signal 46 may be reflected back toward the optical signal generator 40 and photo-detector 50 from the photonic crystal slab 30A. Likewise, reflective optical signal 46' may be reflected back toward the optical signal generator 40 and photo-detector 50 from the photonic crystal slab 30B through the photonic crystal slab 30A.

Figure 4:
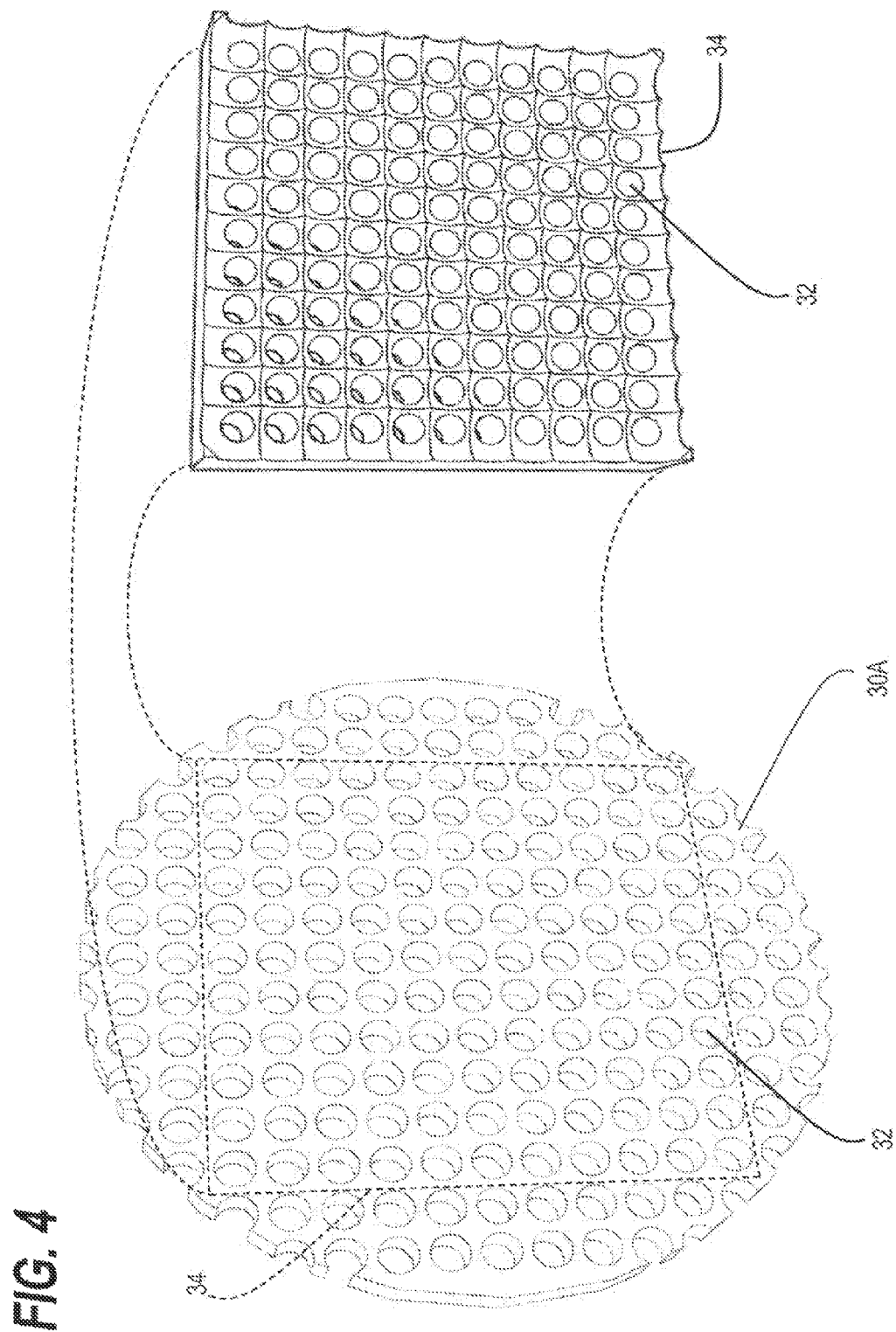
FIG. 4 illustrates a perspective front view of a photonic crystal slab and a perspective partial rear view of the photonic crystal slab.

FIG. 4 illustrates a perspective front view of a representative photonic crystal slab 30A and a perspective partial rear view 34 of the same photonic crystal slab 30A. The photonic crystal slabs 30A-30E are formed from, for example but without limitation, a silicon crystal base substrate, (not shown), and include holes 32 as periodic optical nanostructures that are designed to affect a motion of photons in a similar manner to how periodicity of a semiconductor crystal affects a motion of electrons. In this manner, a periodic optical nanostructure of the photonic crystals slabs 30A-30E can comprise, for example but without limitation, a lattice of optical holes, a lattice of optical beads, and the like.

The series of evenly spaced optical through-holes 32 perforate the photonic crystal slab 30A through the process of Reactive Ion Etching (REI). The REI process additionally causes the separation of individual photonic crystal slabs from the base substrate when a substantially large amount of etching at a bottom of the holes 32 removes the base substrate from which the photonic crystal 30A is formed, thereby allowing the photonic crystal 30A to be separated from the silicon crystal base substrate enabling the photonic crystal structure to be monolithic in nature.

The lattice structure of holes 32 separated from a silicon crystal base substrate produce a periodic dielectric or metallo-dielectric nanostructure on at least one surface of the photonic crystal slab 30A. The spacing and size of the holes 32 creates the particular geometry of the photonic crystal lattice 30A, where diameters of the holes 32 may be, for example but without limitation, about 0.25 microns to about 1.0 micron.

The periodic dielectric or metallo-dielectric nanostructure holes 32 affect propagation of electromagnetic waves transmitted there-through. The propagation of the electromagnetic waves is affected in a similar manner to a periodic potential in a semiconductor crystal affecting an electron motion by defining allowed and forbidden electronic energy bands. Photonic crystals may contain regularly repeating internal regions of periodic structures of high and low dielectric constant. These periodic structures of photonic crystals may be used to provide optical properties comprising, for example but without limitation, inhibition of spontaneous emission, high-reflectivity omni-directional mirrors, low-loss waveguides, and the like. In this manner, the photonic crystal slab 30A reflects an optical signal at a respective frequency.

Although FIG. 4 illustrates one side of the photonic crystal slab 30A being relatively flat, and the reverse side having recessed portions localized around the through-bore of each hole 32, photonic crystal slab 30A may have either configuration, i.e., a flat-flat, flat-recessed or recessed-recessed sided configuration.

Photons of light behaving as waves may propagate through the periodic structures of the photonic crystal slabs 30A-30E depending on their wavelength. Wavelengths of light that are allowed to travel in the photonic crystal slabs 30A-30E are known as allowed modes, groups of allowed modes are known as bands, and disallowed bands of wavelengths are known as photonic band gaps. To provide the optical properties mentioned above, the periodicity of the periodic structures of the photonic crystal slabs 30A-30E should be substantially of a same length-scale as half the wavelength of the electromagnetic waves. In particular, the repeating regions of high and low dielectric constant of the periodic structure should be substantially of an order of a half the wavelength of the electromagnetic waves. For example, the repeating regions of high and low dielectric constants of the periodic structure should be approximately 200 nanometers (blue) to approximately 350 nanometers (red) for photonic crystals operating in a visible part of the electromagnetic spectrum.

A Fabry-Perot (etalon) Interferometer is constructively formed from each pair of adjacent and substantially parallel photonic crystals slabs 30A-30E. The thickness of each of the photonic crystal slabs 30A-30E can be, for example but without limitation, about 400 microns to about 500 microns. Since pairs of the photonic crystals slabs 30A-30E are separated by segments of optical fiber 22A-22D, substantially minor changes in the length between any pair of photonic crystals 30A-30E can create optical interference patterns that can be sensed by the photo-detector 50 and computed by the processor 60 to calculate a mechanical strain for each length L1-L4 of optical fiber defined by one pair of photonic crystals. An amount of light reflection depends on the separation distance L1-L4. Thus, pairs of adjacent photonic crystals 30A-30E form a Fabry-Perot (etalon) interferometer. Furthermore, a single photonic crystal may provide a necessary reflecting surface for two adjacent Fabry-Perot (etalon) interferometers, for example, photonic crystal 30B is a part of a Fabry-Perot (etalon) interferometer defined by photonic crystals 30A and 30B being separated by a segment of optical fiber 22A over a distance of L1, and part of a Fabry-Perot (etalon) interferometer defined by photonic crystals 30B and 30C being separated by a segment of optical fiber 22B over a distance of L2.

Interferometers generally use light or another form of electromagnetic wave for interferometry. Interferometry is a technique for determining properties of two or more waves by measuring an interference pattern created by a superposition of the two or more waves. Interferometry makes use of a principle of superposition to combine separate waves together to cause a result of the combination to have a property that may be used to measure an original state of the two or more waves. When two waves with a substantially equal frequency combine, a resulting interference pattern may be determined by a phase difference between the two waves (i.e., in phase waves constructively interfere and out-of-phase waves destructively interfere). Interference fringes between two coherent beams can be used to determine a motion or relative displacement of the photonic crystals 30A-30E with respect to each other, and thereby measure a strain caused by deformation of the surface 10, (shown in FIG. 1).

In optics, a Fabry-Perot interferometer or etalon is typically made of a transparent plate with a pair of reflecting surfaces such as the photonic crystals 30A and 30B, or two parallel highly reflecting mirrors. The former is an etalon and the latter is an interferometer, but the terminology can be used interchangeably. A transmission spectrum as a function of wavelength exhibits peaks of large transmission corresponding to resonances of the etalon.

A varying transmission function of an etalon is caused by interference between the multiple reflections of light between the two reflecting surfaces such as the photonic crystals 30A and 30B. Constructive interference occurs if the transmitted beams are in phase, which corresponds to a high-transmission peak of the etalon. If the transmitted beams are out-of-phase, destructive interference occurs, which corresponds to a transmission minimum. A single incoming beam of coherent light from the optical signal generator 40 can be split into two beams by a grating or a partial mirror. Each of the two beams travel a different route (path) until recombined before arriving at the photo-detector 50. A path difference in a distance traveled by each beam can create a phase difference between the two beams. The phase difference creates an interference pattern between waves of the two beams. If a single beam has been split along two paths then a phase difference can be used to measure any parameter that changes the phase along the two paths. For example but without limitation, a physical change in a path length, a change in a refractive index along one or more of the two paths, and the like. The changes provide means for measuring a deformation value to compute a strain value of the surface 10.

The ability to sense strain at a very specific point between pairs photonic crystals slabs/wafers, as opposed to much longer lengths of fiber in Fiber Bragg grating, is achieved with the pair photonic crystal strain sensors disposed at the actual location where strain is measured, i.e., where the segment of fiber is between the photonic crystals, or the Fabry Perot cavity. In comparison, Fiber Bragg gratings based sensors require a significantly longer length of fiber, since the multiple gratings along the length of fiber create the periodicity in the fiber that reflects the specific wavelengths.

In summary, a photonic crystal strain sensor includes an optical fiber having a first end and a second end, and at least one pair of photonic crystal lattices disposed between a segment of the optical fiber. The optical fiber and the segment of the optical fiber further can include fused silica communication grade fiber. Each of the at least one pair of photonic crystal lattices can further include a plurality of holes that can have a diameter between 0.25 microns to 1.0 micron, and a thickness between 400 microns to 500 microns. Each pair of photonic crystal lattices forms a Fabry-Perot (etalon) Interferometer. The optical fiber further comprises a central core surrounding by cladding, where the at least one pair of photonic crystal lattices are disposed to interfere with a substantial portion of the central core of the optical fiber. Additionally, a plurality of pairs of photonic crystal lattices can be disposed between corresponding segments of the optical fiber.

A strain sensor system includes an optical fiber, an optical signal generator that transmits an optical signal through the optical fiber, at least two photonic crystal slabs within the optical fiber separated by a first segment of optical fiber, a photo-detector that detects a reflected optical signal from the at least two photonic crystal slabs, and a processor that computes a mechanical strain over the first segment of optical fiber based on the reflected optical signal detected by the photo-detector. The optical signal generator can include a laser or a Light Emitting Diode (LED). The photo-detector can detect reflected optical signals from each corresponding pair of photonic crystal slabs within the optical fiber, and the processor can compute the mechanical strain over each of the plurality of segments of optical fiber based on each respective reflected optical signal. The optical signal generator generates a plurality of wavelength specific optical signals, where each wavelength specific optical signal can corresponds to a predetermined corresponding pair of photonic crystal slabs within the optical fiber.

Figure 5:
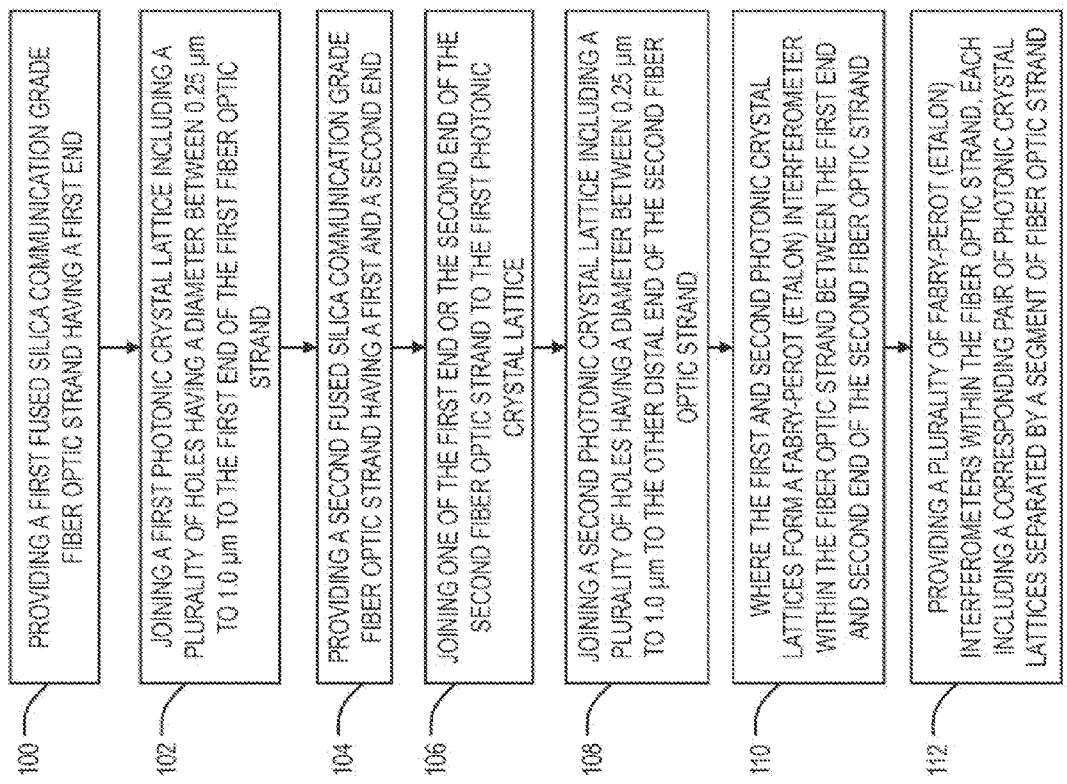
FIG. 5 illustrates a logic flow diagram of a method of fabricating an optical fiber photonic crystal strain sensor according to FIGS. 1-4.

FIG. 5 illustrates a logic flow diagram of a method of fabricating an optical fiber photonic crystal strain sensor according to FIGS. 1-4, where a first fused silica communication grade optical fiber is provided 100 having a first end. A first photonic crystal lattice including a plurality of holes having a diameter between 0.25 microns to 1.0 micron is joined 102 to the first end of the first optical fiber. A second fused silica communication grade optical fiber is provided 104 having a first and a second end. One of the first end or the second end of the second optical fiber is joined 106 to the first photonic crystal lattice, and a second photonic crystal lattice including a plurality of holes having a diameter between 0.25 microns to 1.0 micron is joined 108 to the other distal end of the second optical fiber, where the first and second photonic crystal lattices form 110 a Fabry-Perot (etalon) Interferometer within the optical fiber between the first end and second end of the second optical fiber.

Additionally, a plurality of Fabry-Perot (etalon) Interferometers within the optical fiber may be provided 112, where each includes a corresponding pair of photonic crystal lattices separated by a segment of optical fiber.

A first corresponding pair of photonic crystal lattices is tuned to be sensitive to a first transmitted optical signal having a first optical wavelength, and a second corresponding pair of photonic crystal lattices is tuned to be sensitive to a second transmitted optical signal having a second optical wavelength. The first and second corresponding pairs of photonic crystal lattices are joined between respective segments of optical fiber to form a first and second wavelength tuned Fabry-Perot (etalon) Interferometers, respectively.

Figure 6:
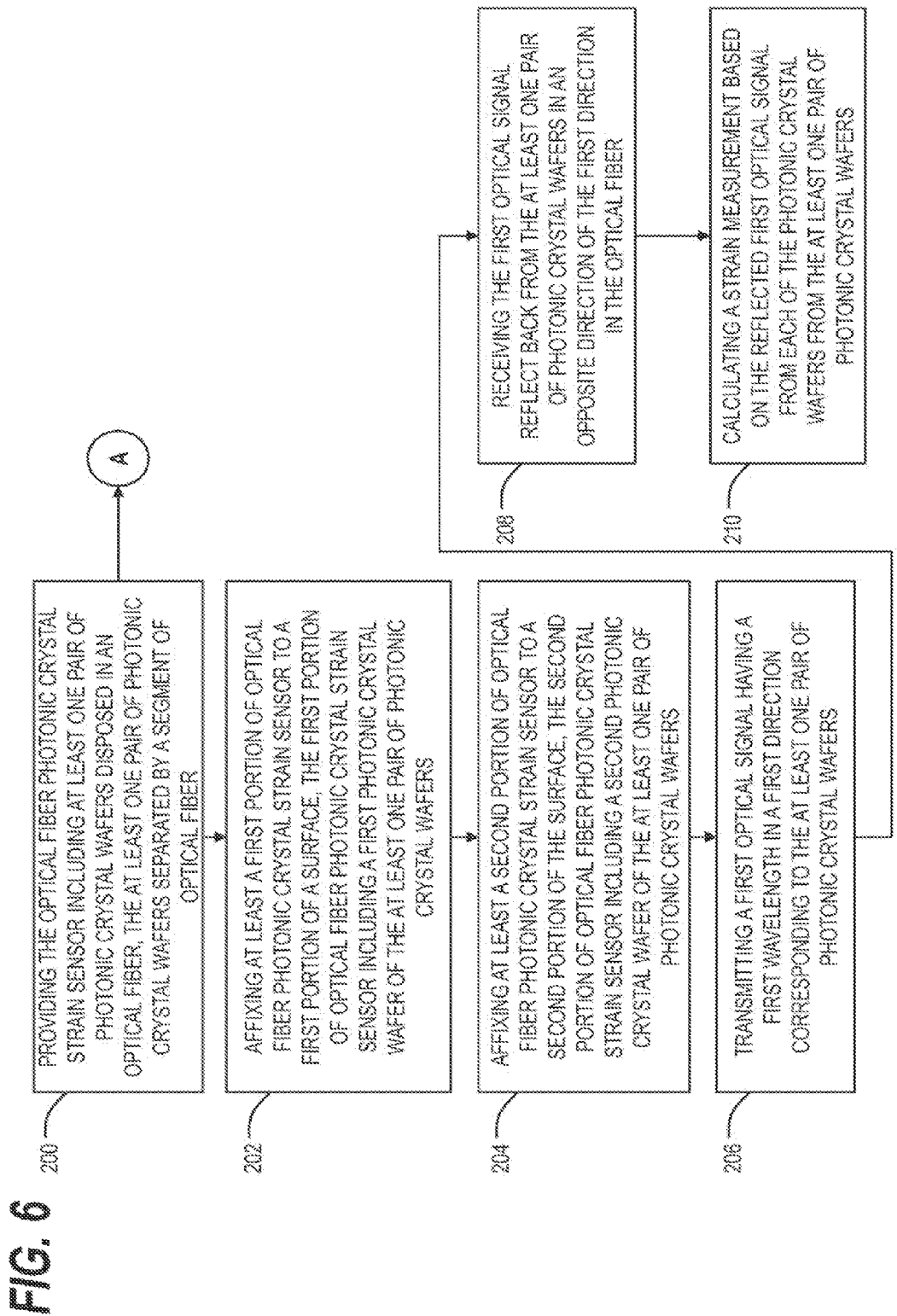
FIG. 6 illustrates a logic flow diagram of a method of using an optical fiber photonic crystal strain sensor according to FIGS. 1-4.

FIG. 6 illustrates a logic flow diagram of a method of using an optical fiber photonic crystal strain sensor as demonstrated in FIGS. 1-4 above. The method provides 200 an optical fiber photonic crystal strain sensor includes one pair of photonic crystal wafers disposed in an optical fiber, the one pair of photonic crystal wafers being separated by a segment of optical fiber. A first portion of optical fiber photonic crystal strain sensor is affixed 202 to a first portion of a surface, where the first portion of optical fiber photonic crystal strain sensor includes a first photonic crystal wafer of the one pair of photonic crystal wafers. A second portion of optical fiber photonic crystal strain sensor is affixed 204 to a second portion of the surface, where the second portion of optical fiber photonic crystal strain sensor includes a second photonic crystal wafer of the one pair of photonic crystal wafers.

A first optical signal having a first wavelength is transmitted 206 in a first direction corresponding to the one pair of photonic crystal wafers. The first optical signal is then received 208 being reflected back from the one pair of photonic crystal wafers in an opposite direction of the first direction in the optical fiber. A strain measurement is then calculated 210 based on the reflected first optical signal from each of the photonic crystal wafers from the one pair of photonic crystal wafers.

Figure 7:
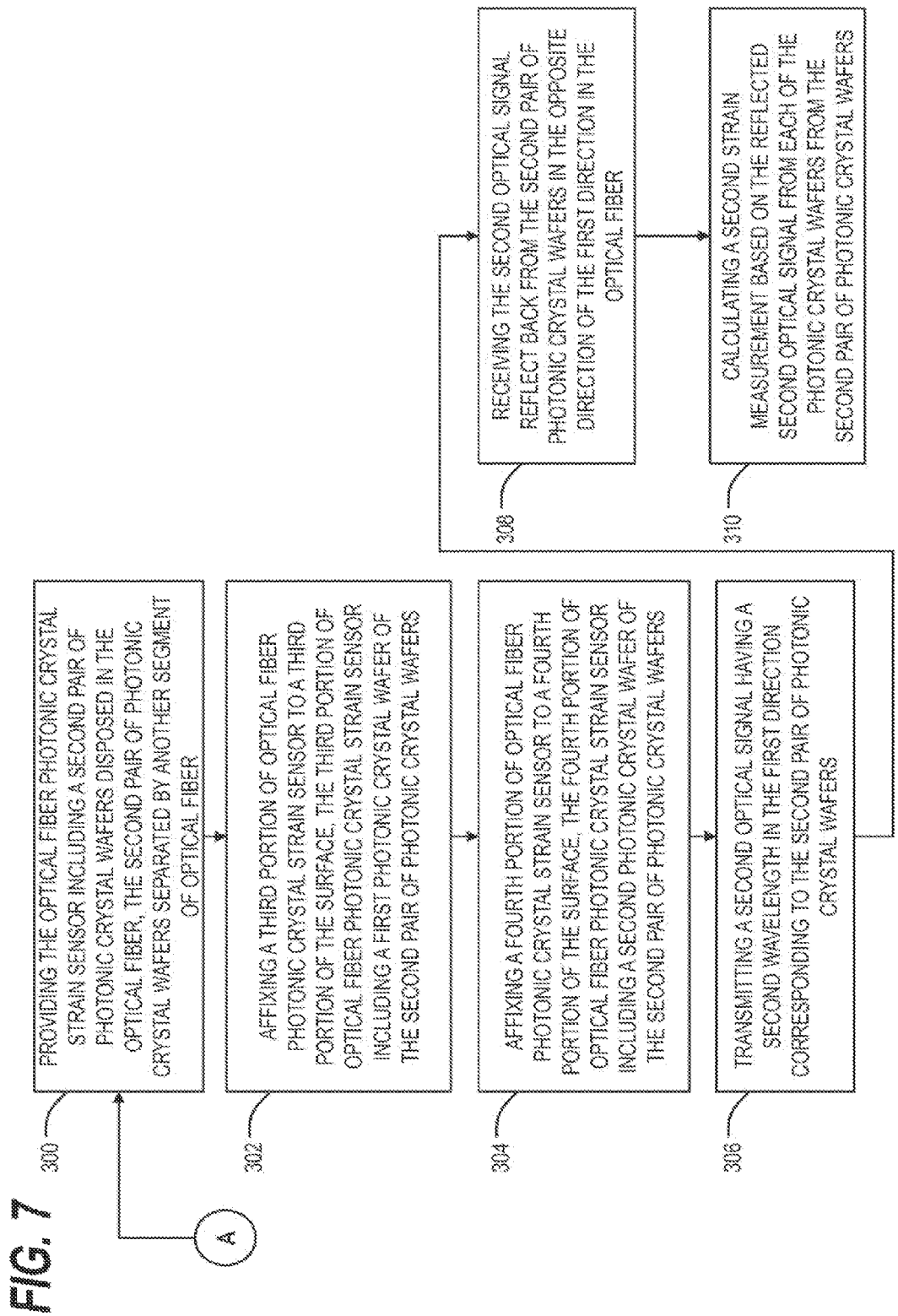
FIG. 7 illustrates a logic flow diagram of a method of using an optical fiber photonic crystal strain sensor according to FIGS. 1-4 and 6.

FIG. 7 illustrates a logic flow diagram of a method of using an optical fiber photonic crystal strain sensor as demonstrated in FIGS. 1-4 and 6 above, where a second strain measurement may be made with the same optical photonic crystal strain sensor by providing 300 the optical fiber photonic crystal strain sensor including a second pair of photonic crystal wafers disposed in the optical fiber, the second pair of photonic crystal wafers separated by another segment of optical fiber. A third portion of optical fiber photonic crystal strain sensor is affixed 302 to a third portion of the surface, where the third portion of optical fiber photonic crystal strain sensor includes a first photonic crystal wafer of the second pair of photonic crystal wafers. A fourth portion of optical fiber photonic crystal strain sensor is affixed 304 to a fourth portion of the surface, the fourth portion of optical fiber photonic crystal strain sensor including a second photonic crystal wafer of the second pair of photonic crystal wafers.

A second optical signal is transmitted 306 having a second wavelength in the first direction corresponding to the second pair of photonic crystal wafers. The second optical signal is received 308 being reflected back from the second pair of photonic crystal wafers in the opposite direction of the first direction in the optical fiber. A second strain measurement 310 is then calculated based on the reflected second optical signal from each of the photonic crystal wafers from the second pair of photonic crystal wafers.

The above disclosure allows for the creation of an optical fiber based strain gauge equivalent to Fiber Bragg Grating type designs, but with the advantages offered by using photonic crystal reflectors of wavelength selectivity, operation with or without laser sources, and interoperation with other photonic crystal sensors on same optical fiber. More specifically, the use of photonic crystals constructed in a manner as to create Fabry-Perot Interferometers leads to inter-operation of multiple sensors on the same optical fiber using different wavelengths of light, the ability to use "sloppy" light sources such as LED as opposed to more expensive laser based light sources, and an ability to sense at a very specific point as opposed to lengths of fiber. This system enables networked sensor coverage of large areas with multiple applications and reduces the complexity of developing such systems while providing many of the same benefits as more complex designs.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A method of measuring a mechanical strain, comprising:
   emitting, with an optical signal generator, an optical signal;
   receiving, at an optical fiber, the optical signal from the optical signal generator;
   disposing at least two photonic crystal slabs within the optical fiber and separated by a first segment of the optical fiber, wherein each of the at least two photonic crystal slabs includes a plurality of holes extending from a first surface to a second surface of the respective photonic crystal slab, wherein the first surface and the second surface of each of the at least two photonic crystal slabs are arranged to have a zero or substantially zero angle of incidence relative to an optical axis of the optical fiber;
   detecting, with a photo-detector, a reflected optical signal from the at least two photonic crystal slabs; and
   computing, with a processor, configured to compute the mechanical strain occurring over the first segment of the optical fiber based on the reflected optical signal detected by the photo-detector.

2. The method of claim 1, wherein the disposing includes each of the at least two photonic crystal slabs comprising a monolithic photonic crystal lattice including the plurality of holes.

3. The method of claim 2, further comprising arranging center axes of the plurality of holes to be parallel or substantially parallel to the optical axis of the optical fiber.

4. The method of claim 1, wherein the disposing includes each of the plurality of holes having a diameter in a range from 0.25 microns to 1.0 micron.

5. The method of claim 1, wherein the disposing comprising disposing a plurality of segments including the first segment and wherein the at least two photonic crystal slabs comprise at least two pairs of the photonic crystal slabs,
   wherein each segment of the plurality of segments is each bounded by a corresponding pair of the at least two pairs of photonic crystal slabs within the optical fiber,
   wherein each of the corresponding pair of the at least two pairs of photonic crystal slabs form a Fabry-Perot (etalon) Interferometer.

6. The method of claim 5, wherein the detecting includes the photo-detector detecting the reflected optical signals from each corresponding pair of the at least two photonic crystal slabs within the optical fiber, and
   the computing includes the processor computing the mechanical strain over each of the plurality of segments of the optical fiber based on each respective reflected optical signal.

7. The method of claim 5, wherein the emitting includes the optical signal generator generating the optical signal having a plurality of wavelength-specific optical signals,
   wherein each of the plurality of wavelength-specific optical signals corresponds to a predetermined corresponding pair of the at least two photonic crystal slabs within the optical fiber.

8. The method of claim 1, further comprising separating for each of the at least two photonic crystal slabs, the respective first surface and the respective second surface by a thickness in a range from 400 microns to 500 microns.

9. The method of claim 1, further comprising physically attaching each of the at least two photonic crystal slabs to an object associated with the mechanical strain.

10. A method, comprising:
    disposing at least two photonic crystal slabs within an optical fiber and separated by a first segment of the optical fiber, wherein each of the at least two photonic crystal slabs includes a plurality of holes extending from a first surface to a second surface of the respective photonic crystal slab, wherein the first surface and the second surface of each of the at least two photonic crystal slabs are arranged to have a zero or substantially zero angle of incidence relative to an optical axis of the optical fiber,
    wherein the optical fiber is configured to receive an optical signal emitted from an optical signal generator, and the optical signal is configured to be reflected from the at least two photonic crystal slabs, and the optical fiber is configured to be coupled to a photo-detector that can detect the reflected optical signal.

11. The method of claim 10, wherein the disposing includes each of the at least two photonic crystal slabs comprises a monolithic photonic crystal lattice including the plurality of holes.

12. The method of claim 11, further comprising arranging center axes of the plurality of holes to be parallel or substantially parallel to the optical axis of the optical fiber.

13. The method of claim 10, wherein the disposing includes each of the plurality of holes having a diameter in a range from 0.25 microns to 1.0 micron.

14. The method of claim 10, wherein the disposing comprising disposing a plurality of segments including the first segment and wherein the at least two photonic crystal slabs comprise at least two pairs of the photonic crystal slabs,
    wherein each segment of the plurality of segments is each bounded by a corresponding pair of the at least two pairs of photonic crystal slabs within the optical fiber,
    wherein each of the corresponding pair of the at least two pairs of photonic crystal slabs form a Fabry-Perot (etalon) Interferometer.

15. The method of claim 10, further comprising separating for each of the at least two photonic crystal slabs, the respective first surface and the respective second surface by a thickness in a range from 400 microns to 500 microns.

16. A method, comprising:
    joining a first photonic crystal lattice to a first end of a first segment of an optical fiber;
    joining one of a first end or a second end of a second segment of the optical fiber to the first photonic crystal lattice; and
    joining a second photonic crystal lattice to the other end of the second segment,
    wherein the first and the second photonic crystal lattices form a Fabry-Perot (etalon) Interferometer within the optical fiber between the first end and second end of the second segment of the optical fiber, wherein the first and the second optical fibers being fused silica communication grade optical fibers, wherein each of the first and the second photonic crystal lattices includes a plurality of holes extending from a first surface to a second surface of the respective one of the first and the second photonic crystal lattices, wherein the first surfaces and the second surfaces of each are arranged to have a zero or substantially zero angle of incidence relative to an optical axis of the first and the second optical fibers, wherein each of the plurality of holes having a diameter in a range from 0.25 microns to 1.0 micron.

17. The method of claim 16, further comprising:
    receiving, at the first segment of the optical fiber, an optical signal emitted by an optical signal generator fiber;
    reflecting the received optical signal from the first and the second photonic crystal lattices;
    detecting, with a photo-detector, the reflected optical signal;

determining, with a processor, a mechanical strain occurring over the second segment of the optical fiber.

18. The method of claim 17, further comprising coupling the first and the second photonic crystal lattices to different portions of a surface, wherein the mechanical strain determined is associated with a mechanical strain of the surface.

19. The method of claim 16, further comprising: providing a plurality of Fabry-Perot (etalon) Interferometers within the optical fiber, each including a corresponding pair of photonic crystal lattices separated by a segment of the optical fiber.

20. The method of claim 19, further comprising:
tuning a first corresponding pair of photonic crystal lattices to be sensitive to a first transmitted optical signal having a first optical wavelength; tuning a second corresponding pair of photonic crystal lattices to be sensitive to a second transmitted optical signal having a second optical wavelength; and
joining the first corresponding pair of photonic crystal lattices and the second corresponding pair of photonic crystal lattices between respective segments of the optical fiber to form a first and second wavelength tuned Fabry-Perot (etalon) Interferometers, respectively.

* * * * *